C. W & W. W. Marsh.

Harvester Rake.

No 2014 Reissued Jun. 27, 1865.

Witnesses.

Samuel Marsh

Albert Hinds.

Inventors

C. W. Marsh

W. W. Marsh

UNITED STATES PATENT OFFICE.

C. W. MARSH AND W. W. MARSH, OF CLINTON, ILLINOIS.

IMPROVEMENT IN REAPING-MACHINES.

Specification forming part of Letters Patent No. 21,207, dated August 17, 1858; Reissue No. 1,719, dated July 5, 1864; Reissue No. 2,014, dated June 27, 1865.

DIVISION No. 1.

*To all whom it may concern:*

Be it known that we, C. W. MARSH and W. W. MARSH, of Clinton, in the county of De Kalb, in the State of Illinois, have invented a new and useful Improvement in Raking Devices for Harvesters; and we do declare that the following is a full, clear, and exact description of the same, reference being had to the annexed drawings, making a part of this specification, in which—

Figure 1:
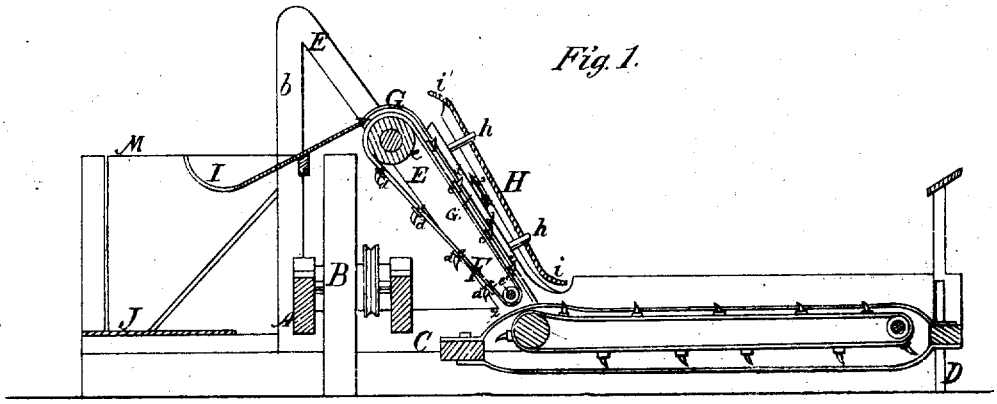
Figure 2:
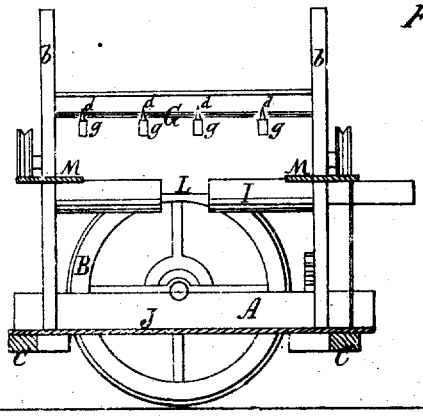
Figure 3:
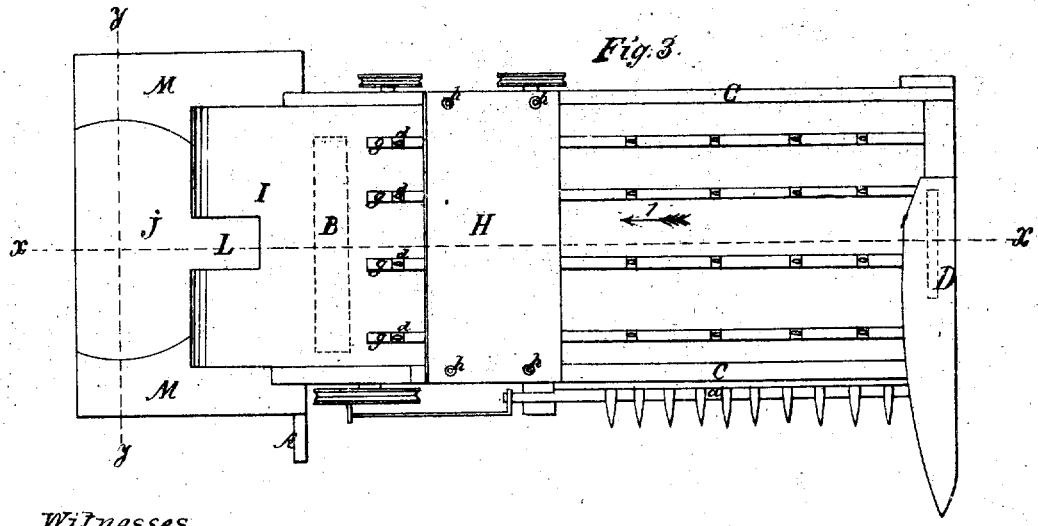

Figure 1 is a longitudinal vertical section of our invention, taken in the line *x x*, Fig. 3. Fig. 2 is a transverse vertical section of the same, taken in the line *y y*, Fig. 3. Fig. 3 is a plan or top view of the same.

Similar letters of reference indicate corresponding parts in the several figures.

This invention relates to an improved method of elevating the cut grain from the level of the platform of a harvester and delivering it, by means of a self-raking device, into an elevated grain-receptacle, from whence it is taken by attendants standing and riding upon the machine, bound into sheaves, and deposited upon the ground.

To enable those skilled in the art to fully understand and construct our invention, we will proceed to describe it.

A represents the main frame of a harvester. B is the driving-wheel, and C is the platform-frame, within which are placed the drive-wheel B and grain-wheel D at their proper places. Said platform-frame C is attached to the main frame A. Within the platform-frame C, behind the ordinary reciprocating sickle, *a*, (which is operated in the ordinary way from the drive-wheel B,) may be placed an endless band of rakes or other self-raking device, which shall carry the cut grain in the direction indicated by the arrow 1, Fig. 3. To the inner side of said platform-frame C, at 2, Fig. 1, an inclined frame, E, is attached, supported at the upper end by uprights *b b*, Fig. 2, having an endless band of rakes, F, placed within it, (having the same inclination as the frame E,) which move in the direction indicated by the arrow 2. The bars *c* (filled with the needed number of teeth *d*) form rakes, which are fastened to a band at each end and constitute the band of rakes F aforesaid, placed beneath the grooved plate G, over the rollers *e e'*, the teeth *d* protruding through the grooves *g*. The rollers *e e'* have their bearings in the frame E, attached, as mentioned above, to the platform-frame C at the lower end and to uprights *b b* at the upper end. H is a loose cover placed over the grooved plate G, above the teeth *d*, and kept to its position by pins *h h h h*, Figs. 1 and 3. This loose cover has the edge of its lower end, *i*, sufficiently turned up to allow the cut grain to pass readily under upon the teeth *d* of the band of rakes F, and the edge of its upper end, *i'*, turned down, so as to compress and direct the grain into the receptacle I. M M are the binders' tables, and J is the binders' platform.

The operation is as follows: As the machine is drawn along the cut grain, falling upon the band of rakes placed within the platform-frame C, behind the sickle *a*, is carried by said band of rakes toward the band of rakes F, to which it is delivered in a continuous stream under the turned-up end *i* of the loose cover H. The band of rakes F carries the grain up under the cover H and delivers it into the receptacle I, the turned-down edge *i'* of cover H causing the grain to be delivered more directly and compactly. Two attendants stand on platform J, and alternately take the sheaves from receptacle I as they collect there and bind them on tables M M, from whence they are deposited upon the ground. The cover H, being attached to the frame E in a loose manner upon pins *h h h h*, adapts itself to the volume of grain being carried up under it, so that if the grain is a light stream it hangs down near enough to the grain to keep it in position upon the teeth of the band of rakes F, and if the stream be very thick and heavy the cover, being loose, as aforesaid, is raised up sufficiently to enable the grain to pass readily through the pins *h h h h*, always holding it in proper position, but allowing it to adapt itself to the weight of the grain being carried up. The turned-up edge *i* allows the grain to pass freely under the cover, and the turned-down edge *i'* compresses and directs the grain into receptacle I, as aforesaid. Thus it will be seen that the grain by this method will be elevated to the proper height required by the position of the receptacle I, and will be delivered therein compactly and steadily and at a convenient height for the attendant binders.

We are aware that endless bands of rakes have been used to convey cut grain from the platforms of harvesters, and we do not claim them for such purpose, broadly; but We do claim and desire to secure by Letters Patent—

1. The secondary elevating band of rakes F, consisting of toothed slats extending across on the under side of a slotted platform, the teeth protruding through the slots in the manner described and used in connection with the binders' grain-receptacle I, substantially as and for the purpose set forth.

2. The loose cover H, whose upper and lower edges are curved, as described, when used in connection with the steady-pins *h h h h* and the secondary band of rakes, as described.

In testimony whereof we, the said C. W. MARSH and W. W. MARSH, hereto subscribe our names, in the presence of the witnesses whose names are hereto subscribed, on this 22d day of November, 1864.

C. W. MARSH.
W. W. MARSH.

Witnesses:
SAMUEL MARSH,
ALBERT HINDS.